United States Patent
Ghigliotty Rosado et al.

(10) Patent No.: US 12,540,552 B2
(45) Date of Patent: Feb. 3, 2026

(54) AIRFOILS WITH AXIAL LEADING EDGE IMPINGEMENT SLOTS

(71) Applicant: RTX Corporation, Farmington, CT (US)

(72) Inventors: Jaime G. Ghigliotty Rosado, Cabo Rojo, PR (US); Brandon W. Spangler, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/118,471

(22) Filed: Mar. 7, 2023

(65) Prior Publication Data

US 2024/0301796 A1 Sep. 12, 2024

(51) Int. Cl.
*F01D 5/18* (2006.01)

(52) U.S. Cl.
CPC ............ *F01D 5/18* (2013.01); *F05D 2230/21* (2013.01); *F05D 2260/201* (2013.01)

(58) Field of Classification Search
CPC ............................. F01D 5/18; F05D 2260/201
See application file for complete search history.

(56) References Cited

U.S. PATENT DOCUMENTS

| | | | |
|---|---|---|---|
| 5,156,526 A | 10/1992 | Lee et al. | |
| 5,246,340 A * | 9/1993 | Winstanley | F01D 5/187 415/115 |
| 5,271,715 A * | 12/1993 | Zelesky | F01D 5/187 416/97 R |
| 5,296,308 A | 3/1994 | Caccavale et al. | |
| 6,206,638 B1 | 3/2001 | Glynn et al. | |
| 6,290,463 B1 | 9/2001 | Fargher et al. | |
| 6,626,230 B1 | 9/2003 | Woodrum et al. | |
| 7,131,818 B2 | 11/2006 | Cunha et al. | |
| 7,141,812 B2 | 11/2006 | Appleby et al. | |
| 7,217,092 B2 * | 5/2007 | Lee | F01D 5/187 416/97 R |
| 7,293,961 B2 | 11/2007 | Lee et al. | |

(Continued)

FOREIGN PATENT DOCUMENTS

WO 2016/122483 A1 8/2016

OTHER PUBLICATIONS

US Office Action dated Dec. 27, 2023 for U.S. Appl. No. 18/118,706.
(Continued)

*Primary Examiner* — Nathaniel E Wiehe
*Assistant Examiner* — Aye S Htay
(74) *Attorney, Agent, or Firm* — Bachman & LaPointe, P.C.

(57) ABSTRACT

A turbine engine airfoil element has an airfoil having: a pressure side and a suction side; and a plurality of spanwise passageway legs. The passageway legs include: a leading edge impingement cavity; and a plurality of main body feed passageway legs along a camber line. A wall separates the leading edge impingement cavity from a leading one of the main body feed passageway legs, the wall having a suction side section and a pressure side section joining at a junction, the junction forming a vertex of an angle of transverse cross-section of the wall; and a plurality of impingement feed holes through the wall. The plurality of impingement feed holes are larger thickness-wise than span-wise.

20 Claims, 7 Drawing Sheets

(56) References Cited

U.S. PATENT DOCUMENTS

| | | |
|---|---|---|
| 7,871,245 B2 | 1/2011 | Pietraszkiewicz et al. |
| 8,057,183 B1 * | 11/2011 | Liang ................... F01D 5/187 |
| | | 416/96 A |
| 8,070,442 B1 | 12/2011 | Liang |
| 8,657,576 B2 | 2/2014 | Tibbott et al. |
| 9,115,590 B2 | 8/2015 | Spangler et al. |
| 9,272,324 B2 | 3/2016 | Merrill et al. |
| 9,739,155 B2 | 8/2017 | Smith et al. |
| 9,988,913 B2 | 6/2018 | Spangler |
| 9,995,149 B2 | 6/2018 | Foster et al. |
| 10,207,315 B2 | 2/2019 | Appleby et al. |
| 10,252,328 B2 | 4/2019 | Propheter-Hinckley |
| 10,378,364 B2 | 8/2019 | Spangler et al. |
| 10,731,474 B2 | 8/2020 | Kohli et al. |
| 10,871,074 B2 | 12/2020 | Spangler et al. |
| 11,111,857 B2 | 9/2021 | Spangler |
| 11,149,550 B2 | 10/2021 | Spangler et al. |
| 11,220,912 B2 | 1/2022 | Spangler |
| 11,286,793 B2 | 3/2022 | Spangler et al. |
| 11,459,897 B2 | 10/2022 | Spangler et al. |
| 11,499,434 B2 | 11/2022 | Dyson et al. |
| 2008/0175714 A1 | 7/2008 | Spangler et al. |
| 2009/0074575 A1 * | 3/2009 | Propheter-Hinckley ................... |
| | | F01D 5/188 |
| | | 416/95 |
| 2010/0303635 A1 * | 12/2010 | Townes ................... F01D 5/187 |
| | | 416/97 R |
| 2013/0280091 A1 * | 10/2013 | Propheter-Hinckley ................... |
| | | B22C 9/24 |
| | | 427/180 |
| 2014/0093392 A1 | 4/2014 | Tibbott et al. |
| 2015/0354372 A1 | 12/2015 | McComb |
| 2016/0090847 A1 * | 3/2016 | Shchukin ................ F01D 5/187 |
| | | 416/96 R |
| 2017/0335692 A1 | 11/2017 | King et al. |
| 2018/0112547 A1 | 4/2018 | Snider et al. |
| 2019/0169994 A1 | 6/2019 | Hu et al. |
| 2019/0186291 A1 | 6/2019 | LoRicco et al. |
| 2019/0316472 A1 | 10/2019 | Xu |
| 2020/0347734 A1 * | 11/2020 | Spangler ................. F01D 5/187 |
| 2021/0140323 A1 | 5/2021 | Spangler et al. |
| 2021/0324741 A1 | 10/2021 | Spangler |
| 2022/0403746 A1 | 12/2022 | Spangler et al. |

OTHER PUBLICATIONS

European Search Report dated Sep. 6, 2024 for European Patent Application No. 24161760.4.

* cited by examiner

AIRFOILS WITH AXIAL LEADING EDGE IMPINGEMENT SLOTS

BACKGROUND

The disclosure relates to gas turbine engines. More particularly, the disclosure relates to airfoil cooling passageways and their manufacture.

Gas turbine engines (used in propulsion and power applications and broadly inclusive of turbojets, turboprops, turbofans, turboshafts, industrial gas turbines, and the like) internally-cooled hot section components. Key amongst these components are turbine section blades and vanes (collectively airfoil elements). Such cooled airfoil elements typically include generally spanwise/radial feed passageways with outlets (e.g., film cooling outlets) along the external surface of the airfoil. In typical designs, the feed passageways are arrayed streamwise along the camber line between the leading edge and the trailing edge. In many airfoils, along the leading edge there is an impingement cavity fed by a leading feed passageway. Similarly, there may be a trailing edge discharge slot fed by a trailing feed passageway.

In various situations, the number of spanwise passageways may exceed the number of feed passageways if one of the passageways serpentines (e.g., a blade passageway having an up-pass leg from the root, a turn near the tip, and then a down-pass leg heading back toward the root). In some such implementations, the down-pass may, for example, feed the trailing edge discharge slot.

Whereas blades will have cooling passageway inlets along their roots (e.g., dovetail or firtree roots) with feed passageway trunks extending spanwise/radially outward from the root and into the airfoil, depending on implementation, vanes may more typically have inlets along an outer diameter (OD) shroud so that the feed passageways extend spanwise/radially inward.

However, there are alternatives including cantilevered vanes mounted at their outer diameter ends (e.g., for counter-rotating configurations) and the like.

U.S. Pat. No. 5,296,308, Mar. 22, 1994, to Caccavale et al. and entitled "Investment Casting Using Core with Integral Wall Thickness Control Means", (the '308 patent), shows a ceramic feedcore having spanwise sections for casting associated passageways. Additionally, the sections have protruding bumpers to space the feedcore centrally within an investment die for overmolding.

Additional forms of airfoil elements lack the traditional single grouping of upstream-to-downstream spanwise passages along the camber line of the airfoil. Instead, walls separating passages may have a lattice-like structure when viewed in a radially inward or outward view.

One example includes U.S. Pat. No. 10,378,364, Aug. 13, 2019, to Spangler et al. and entitled "Modified Structural Truss for Airfoils", (the '364 patent), the disclosure of which is incorporated by reference herein in its entirety as if set forth at length. Viewed in a spanwise/radial inward or outward section, the '364 patent shows a streamwise series of main air passageways falling along the camber line. In a particular illustrated example, three of those passageways have approximately a rounded-corner convex quadrilateral cross-section/footprint with an opposite pair of corners falling approximately along the camber line so that the leading corner of one passageway is adjacent the trailing corner of another.

Along the pressure and suction side, a series of respective rounded-corner triangular cross-section passageways (skin passageways) alternate with the main passageways with a base of the triangle approximately parallel to and spaced apart from the adjacent pressure or suction side and the opposite corner of the triangle pointed inward to create thin walls between such triangular passageway and the adjacent two main passageways. Depending upon implementation, the '364 configuration may be cast by a ceramic casting core assembly where a main feedcore forms the main passageways and any additional adjacent passageways falling along the camber line. A pressure side core and a suction side core may form the respective associated triangular passageways. Each such pressure side core or suction side core may have spanwise triangular section segments linked by core tie sections at spanwise intervals.

In some embodiments, the main passageways and the skin passageways may extend all the way to associated inlets (e.g., at an ID face of a blade root). In some embodiments, they remain intact/discrete all the way from the inlets and into the airfoil. In other embodiments, various of the passageways may merge (merger being viewed in the upstream direction of airflow through the passageways; with the passageways branching from trunks when viewed in the downstream airflow direction). One example of discrete intact passageways from inlets in a root is shown in U.S. Pat. No. 11,149,550, Oct. 19, 2021, to Spangler et al. and entitled "Blade neck transition". (the '550 patent), the disclosure of which is incorporated by reference herein in its entirety as if set forth at length.

Another example of passageway layout is shown in U.S. Pat. No. 11,111,857, Sep. 7, 2021, to Spangler and entitled "Hourglass airfoil cooling configuration", (the '857 patent), the disclosure of which is incorporated by reference herein in its entirety as if set forth at length.

For impingement feed of the leading edge spanwise cavity, there are typically a spanwise array of holes through the wall separating that cavity from a feed passageway immediately streamwise downstream thereof. However, other hole forms are proposed. U.S. Pat. No. 6,290,463. Sep. 18, 2001, to Fargher et al. and entitled "Slotted Impingement Cooling of Airfoil Leading Edge", (the '463 patent), alternatively shows: a spanwise array of holes; a single long span-wise slot; and multiple shorter end-to-end span-wise slots.

US patent application publication 20150354372A1, Dec. 10, 2015, to Quach et al. and entitled "Gas Turbine Engine Component with Angled Aperture Impingement", shows diagonally elongate impingement "slots".

SUMMARY

One aspect of the disclosure involves a turbine engine airfoil element comprising: an airfoil having a pressure side and a suction side and a plurality of spanwise passageway legs. The spanwise passageway legs include a leading edge impingement cavity and a plurality of main body feed passageway legs along a camber line. A wall separates the leading edge impingement cavity from a leading one of the main body feed passageway legs, the wall having a suction side section and a pressure side section joining at a junction, the junction forming a vertex of an angle of transverse cross-section of the wall. A plurality of impingement feed holes extend through the wall. The plurality of impingement feed holes are larger thickness-wise than span-wise.

In a further embodiment of any of the foregoing embodiments, additionally and/or alternatively, the plurality of impingement feed holes have a thickness width at least 200% of a spanwise height.

In a further embodiment of any of the foregoing embodiments, additionally and/or alternatively, the plurality of impingement feed holes have a central height and a height halfway to each transverse end of less than 80% of the central height.

In a further embodiment of any of the foregoing embodiments, additionally and/or alternatively, the plurality of impingement feed holes have an obround cross-section.

In a further embodiment of any of the foregoing embodiments, additionally and/or alternatively, the plurality of impingement feed holes have a continuously curving cross-section.

In a further embodiment of any of the foregoing embodiments, additionally and/or alternatively, the plurality of impingement feed holes have a sectional transverse end-to-end direction 75° to 115° off radial.

In a further embodiment of any of the foregoing embodiments, additionally and/or alternatively, the plurality of impingement feed holes have a sectional transverse end-to-end direction 75° to 115° off spanwise.

In a further embodiment of any of the foregoing embodiments, additionally and/or alternatively, the plurality of impingement holes span the junction.

In a further embodiment of any of the foregoing embodiments, additionally and/or alternatively, the plurality of spanwise passageway legs further comprise a plurality of skin passageways including: a plurality of pressure side skin passageways; and a plurality of suction side skin passageways.

In a further embodiment of any of the foregoing embodiments, additionally and/or alternatively, the pressure side passageways and the suction side passageways have rounded-corner triangular or trapezoidal cross-section.

In a further embodiment of any of the foregoing embodiments, additionally and/or alternatively, the turbine engine airfoil element comprises four to ten said pressure side passageways and four to ten said suction side passageways.

In a further embodiment of any of the foregoing embodiments, additionally and/or alternatively: adjacent pressure side passageways connect to each other via a plurality of linking passageways; adjacent suction side passageways connect to each other via a plurality of linking passageways; and the linking passageways extend less deeply into the airfoil cross-section than do the adjacent pressure or suction side passageways.

In a further embodiment of any of the foregoing embodiments, additionally and/or alternatively, the turbine engine airfoil element is a blade having an attachment root: the main body passageways extend from one or more inlets at an inner diameter (ID) end of the root; and the pressure side passageways and suction side passageways extend from one or more inlets at the inner diameter (ID) end of the root.

In a further embodiment of any of the foregoing embodiments, additionally and/or alternatively, the plurality of spanwise passageway legs further comprise a plurality of skin passageways including: a plurality of pressure side skin passageways each nested between a pressure side and two adjacent main body passageways; and a plurality of suction side skin passageways each nested between the suction side and two adjacent main body passageways.

In a further embodiment of any of the foregoing embodiments, additionally and/or alternatively, the plurality of spanwise passageways further include a plurality of pressure side passageways including: at least one first pressure side passageway each nested between the pressure side and two adjacent main body passageways.

In a further embodiment of any of the foregoing embodiments, additionally and/or alternatively, a turbine engine includes the turbine engine airfoil element.

In a further embodiment of any of the foregoing embodiments, additionally and/or alternatively, the turbine engine airfoil element is a turbine section blade or vane.

In a further embodiment of any of the foregoing embodiments, additionally and/or alternatively, a method for manufacturing the turbine engine airfoil element comprises: assembling to each other a feedcore, a pressure side skin core, and a suction side skin core; overmolding the assembly with a fugitive; shelling the fugitive to form a shell; casting alloy in the shell; and deshelling and decoring the cast alloy. The feedcore has sections for forming the plurality of main body passageways. The pressure side skin core has sections for forming a plurality of pressure side passageways. The suction side skin core has sections for forming a plurality of suction side passageways.

In a further embodiment of any of the foregoing embodiments, additionally and/or alternatively, the fugitive is wax and the shell is dewaxed prior to the casting.

In a further embodiment of any of the foregoing embodiments, additionally and/or alternatively, the method further comprises: molding the feedcore, the pressure side skin core, and the suction side skin core of ceramic material.

The details of one or more embodiments are set forth in the accompanying drawings and the description below. Other features, objects, and advantages will be apparent from the description and drawings, and from the claims.

Figure 1:
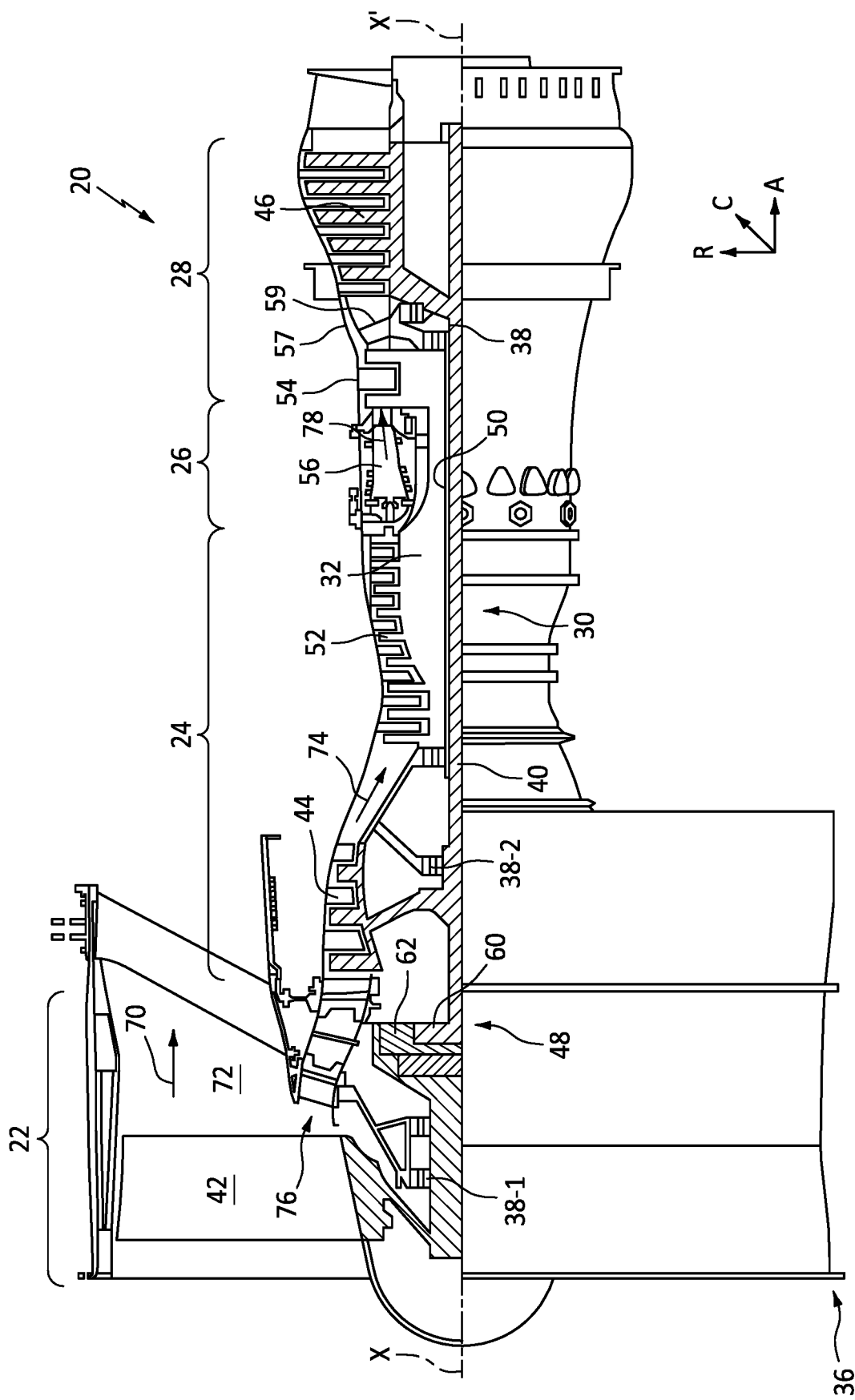
FIG. 1 is a cross-sectional view of an example gas turbine engine, in accordance with various embodiments.

Some of the sectional views show out of plane features for purposes of illustration.

Like reference numbers and designations in the various drawings indicate like elements.

DETAILED DESCRIPTION

As noted above, a typical leading edge impingement cavity is fed by a spanwise (radial) array of circular cross-section impingement cooling holes from the immediate chordwise downstream feed passageway leg. These holes are cast by associated sections of a ceramic feedcore (or feedcore assembly) in an investment casting process. The ceramic feedcore (or piece thereof) may be molded from a ceramic slurry and then fired to harden. In one group of baseline examples, there may be a feedcore assembly wherein a piece casts a stream-wise series of passageway legs distributed approximately along the camber line of the airfoil. Separate pressure side pieces and suction side pieces are assembled to form a core assembly for casting airfoils that include additional pressure side skin passageway legs and suction side skin passageway legs.

In the investment casting process, the core may be overmolded with sacrificial pattern material (e.g., wax). The resulting wax pattern may be shelled (e.g., with a ceramic stucco) and then de-waxed (e.g., autoclaved) to create a casting shell or section thereof. The casting shell or section thereof may be fired prior to casting. Depending on the particular implementation, the shell may have additional sections or pieces including grain starters, seeds, feeders/sprues, vents, and the like. Such a shell assembly may include multiple individual shells for individual elements (e.g., an assembly of a single pour cone to multiple individual shell sections for casting individual blades.

In designing the impingement cooling holes and associated core geometry, a number of considerations may come into play. Fluidically, there may be issues of how the impingement airflow distributes into the impingement cavity and what the total airflow is. Small circular impingement cooling holes may produce narrow jets that produce concentrated local cooling where they impact the interior surface of the impingement cavity. Where a broader cooling is desired, increasing the hole size may increase airflow and reduce process efficiency. Additionally, reorienting the impingement cooling holes for targeted cooling passageways may become impractical due to issues of core manufacture. Reorienting the associated core sections may create molding difficulties for the casting core. These molding difficulties (to the extent overcomeable) may involve some combination of necessitating complex core molds (dies) in terms of geometry and/or multiple pieces and associated pulls.

As is discussed further below, an improved impingement hole geometry (and associated core section geometry) may be achieved by transversely (not radially/spanwise but transverse thereto) elongating the impingement hole. In one or more implementations this may yield improved cooling and/or manufacturability.

The detailed description of example embodiments herein makes reference to the accompanying drawings, which show example embodiments by way of illustration and their best mode. While these example embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air (bypass air flow) 70 along a bypass flow-path 72 while the compressor section 24 drives air (air flow) 74 along a core flow-path 76 for compression and communication into the combustor section 26 (for mixing with fuel and combusting) then expansion of the combustion gas 78 through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow is compressed by the low pressure compressor section 44 then the high pressure compressor 52, mixed and burned with fuel in the combustor 56, then the resulting combustion gas 78 is expanded over the high pressure turbine 54 and the low pressure turbine 46. The mid-turbine frame 57 includes airfoils 59 which are in the core flow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are examples of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
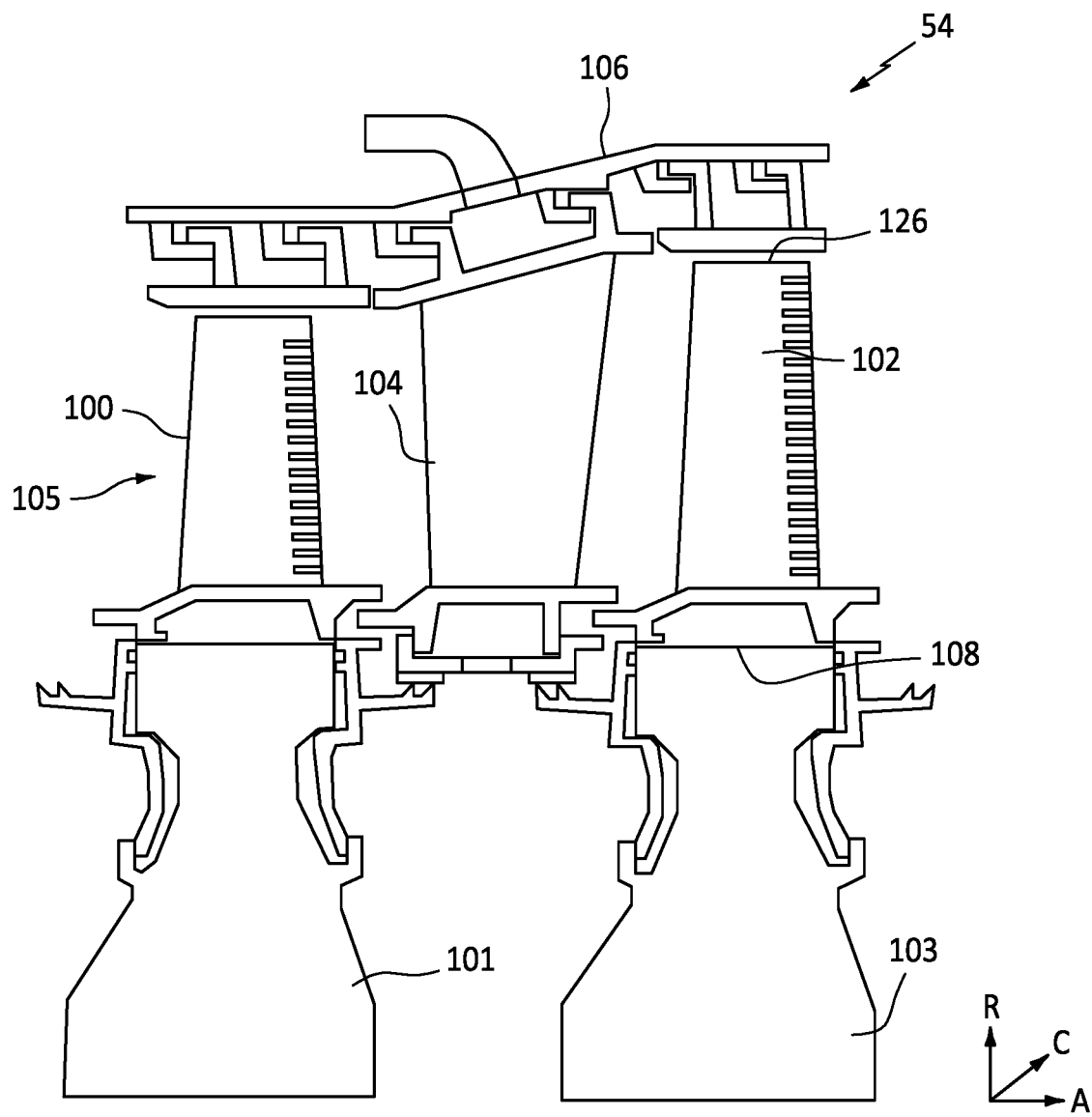
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 126. Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 126. The blade 102 may define cavities that transport the cooling airflow through the blade 102 to the other of the inner diameter edge 108 or the outer diameter edge 126.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3:
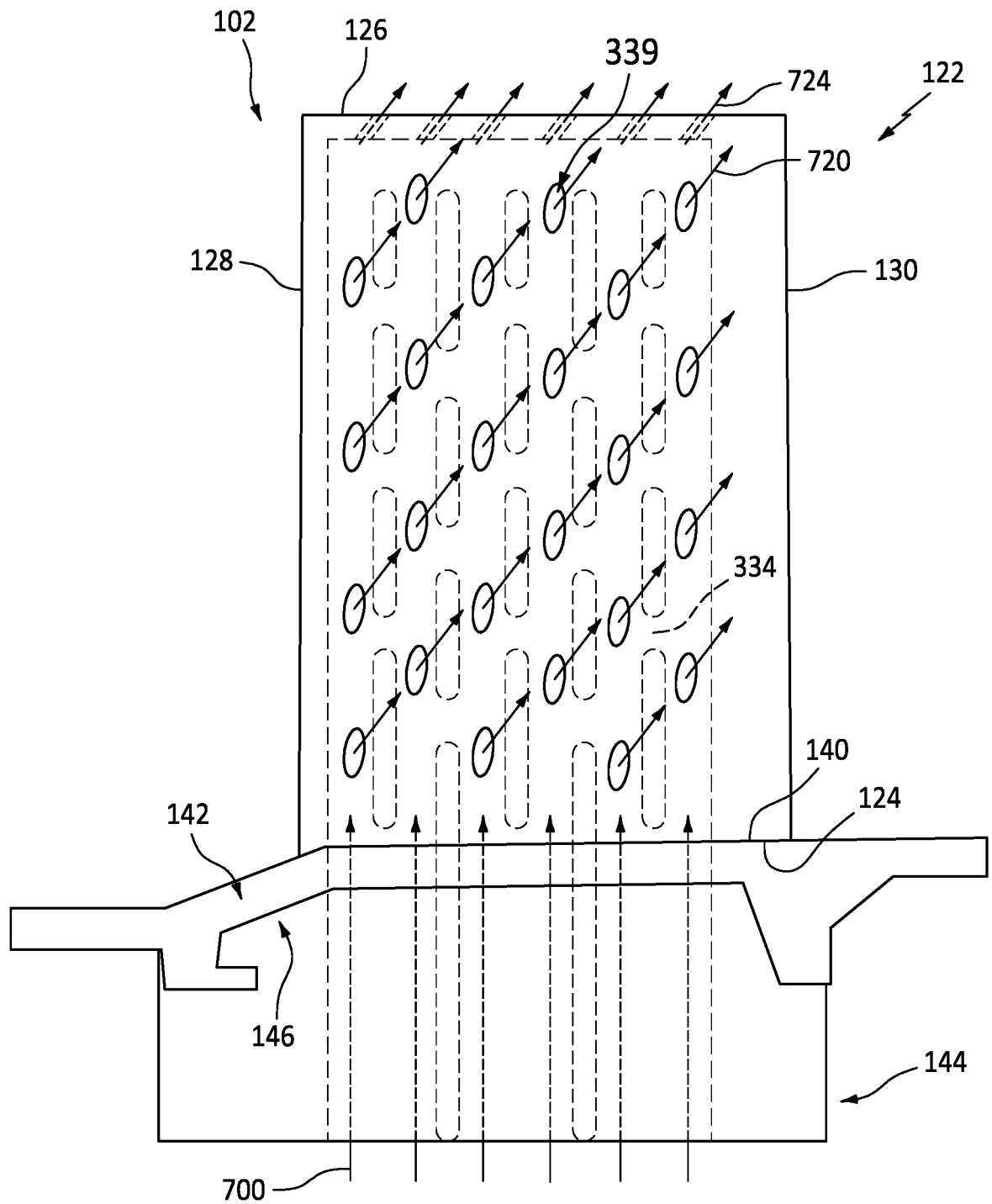
FIG. 3 is a schematic side view of a turbine blade for the high pressure turbine section of FIG. 2.

Turning now to FIG. 3, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge 128 and an opposing trailing edge 130. A pressure side 132 (FIG. 4) and an opposing suction side 134 extend between the leading edge 128 and trailing edge 130.

The airfoil inboard end is disposed at the outboard surface 140 (FIG. 3) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica. The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surface of the platform. An example coating comprises a metallic bondcoat (e.g., MCrAlY, e.g., thermal sprayed or cathodic arc sprayed) and one or more layers of ceramic (e.g., a YSZ and/or GSZ, e.g., thermal sprayed and/or vapor deposited such as EB-PVD).

Figure 4:
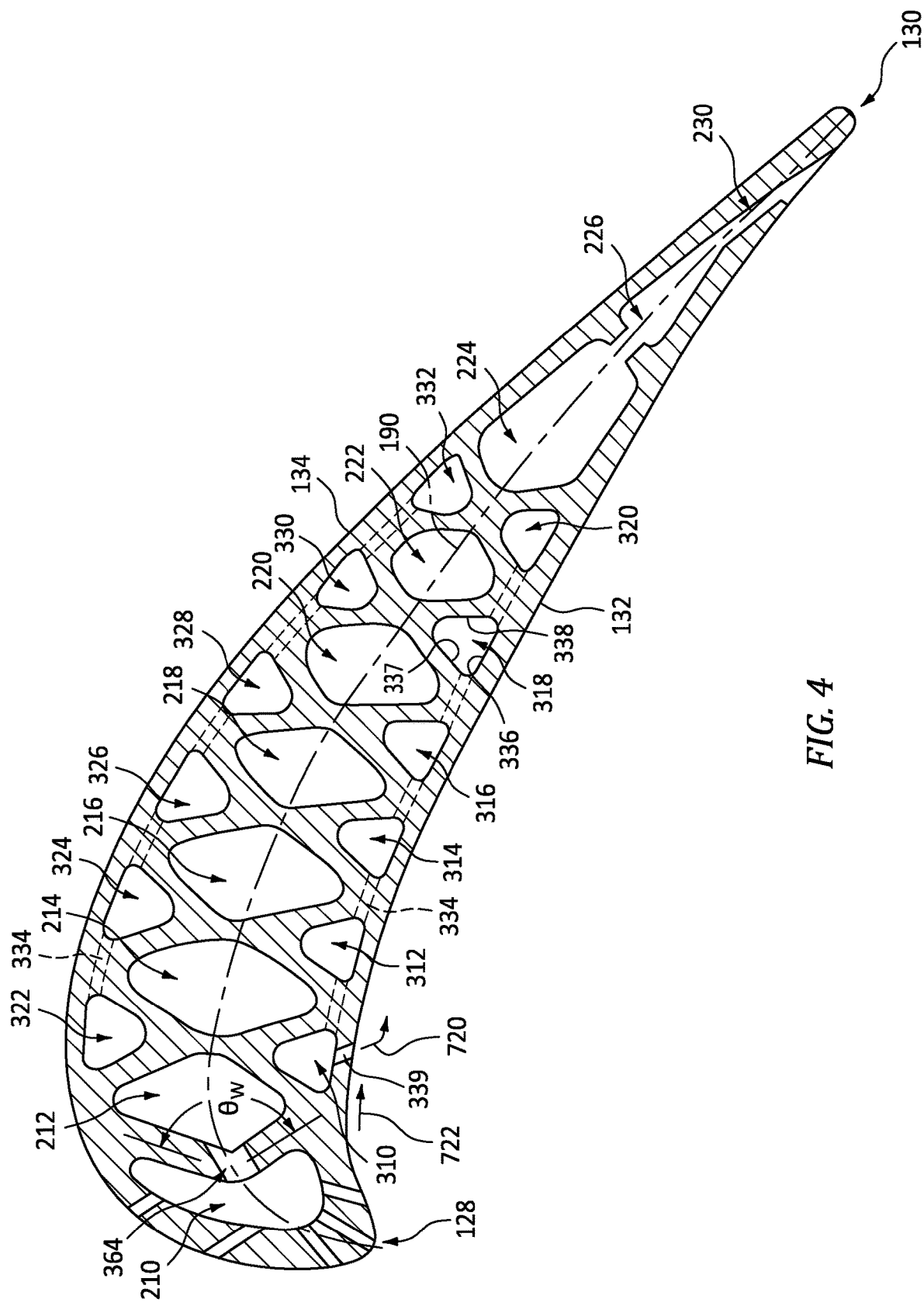
FIG. 4 is a transverse (generally tangential to the engine centerline) sectional view of an airfoil of the turbine blade of FIG. 3.

FIG. 4 also shows a camber line 190 in a transverse sectional view. Three-dimensionally, the camber line is a mathematical surface formed by the camber lines along all the sequential sections. The blade has a cooling passageway system with a plurality of spanwise passageways (passageway legs/segments/sections) within the airfoil. These legs include a series of passageways straddling the camber line arrayed from upstream to downstream. These are main body passageways. These include a leading first passageway 210, a second passageway 212, a third passageway 214, a fourth passageway 216, a fifth passageway 218, a sixth passageway 220, a seventh passageway 222, an eighth passageway 224, and a ninth passageway 226. The ninth passageway may feed a discharge slot 230 having an outlet falling at or near the trailing edge (e.g., an outlet 232 shifted slightly to the pressure side in this example). The leading passageway 210 may be an impingement cavity fed by the second passageway 212.

As is discussed further below, the example passageways 212, 214, 216, 218, 220, and 222 have rounded-corner quadrilateral sections with the orientations of passageways 212, 214, 216, 218, 220, and 222 being such that corners of the cross-section fall on or near the camber line. Similarly, the leading corner of passageway 224 is on or near the camber line. When combined with skin passageways 310, 312, 314, 316, 318, and 320 on the pressure side and 322, 324, 326, 328, 330, and 332 on the suction side, these form generally X-cross-section sections of cast blade substrate between the passageways. Nevertheless, there may be alternative shapes to the cross-sections/footprints of the main body passageways and associated skin passageways.

The main body passageways may be cast by one or more main body cores or feedcores having corresponding/complementary sections. In one example, a main body core has sections forming the main body passageways and trailing edge slot. Some of the sections may extend from trunks that form inlet trunks in the blade root. As noted above, the impingement cavity 210 would not have its own trunk but rather would be fed from the next main passageway/cavity 212 serving as a feed cavity. In various embodiments, the remaining passageways may have individual trunks or there may be merger of trunks (e.g., one trunk from one root ID inlet diverges to feed two (or more) of the main body passageways). Also, one or more of the main body passageways (passageway legs) may be represented by a downpass fed by one of the other passageways (passageway legs) rather than as an up-pass with its own trunk. And a vane would likely have opportunities for a yet more different feed arrangement.

In casting, a shelled pattern (not shown) includes a ceramic stucco shell over pattern wax. The pattern wax was overmolded to a casting core assembly including a main body core or feedcore and, as discussed further below, a pressure side skin core and a suction side skin core. An example main body core is a single molded core having respective sections respectively complementary to the main body passageways. An example number of the main body passageways and core sections is ten, more broadly two to sixteen or two to twelve.

Although the example main body core is a single piece, alternative multipiece combinations are possible. As is discussed further below, the skin cores may each be a single piece or otherwise an integral unit.

Figure 5:
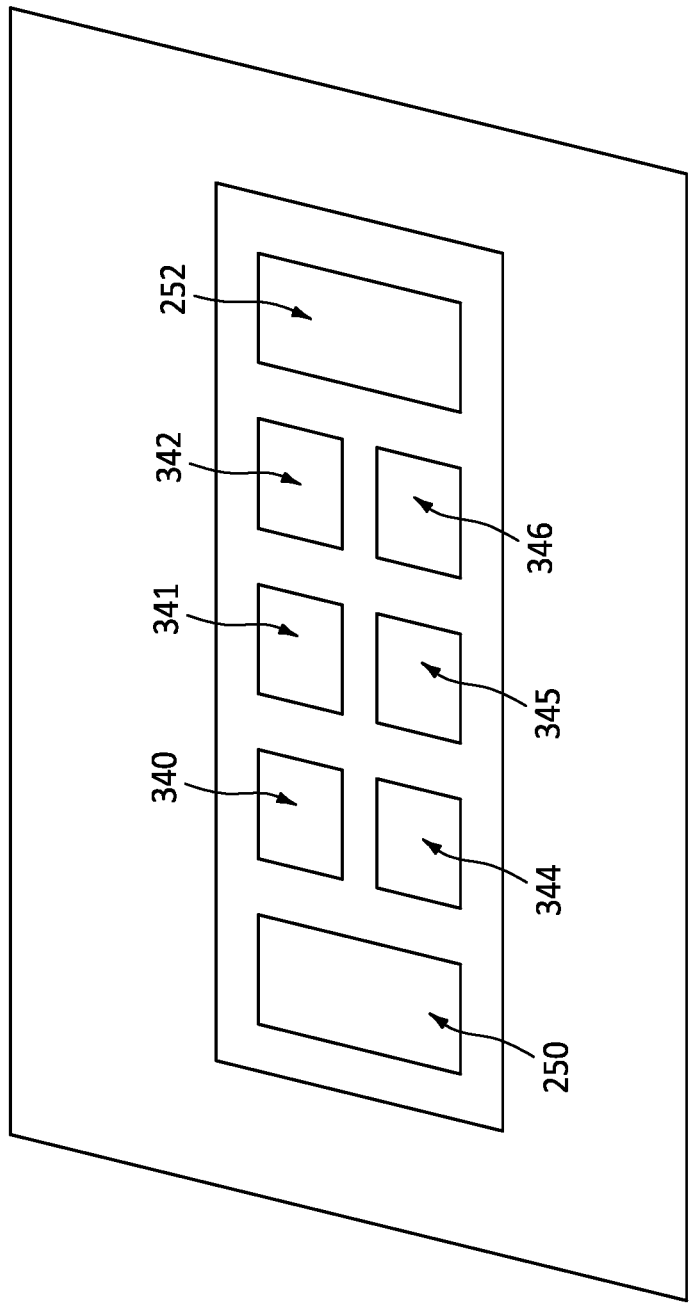
FIG. 5 is an inner diameter (ID) end view of the turbine blade.

The various spanwise passageways may connect to associated inlet ports (FIG. 5) in the root and may connect to associated outlet ports along the airfoil lateral surface or at the tip. FIG. 5 shows a leading inlet port (inlet) 250 and a trailing inlet port (inlet) 252. In this particular example, these two ports feed respective groups of the main body passageways. In this particular example, the leading inlet 250 feeds a trunk that branches to feed the first/leading four main body feed passageways 212, 214, 216, and 218 (and thus the leading passageway/cavity 210 via the feed passageway 212). Similarly, the trailing inlet 252 feeds a corresponding trunk that, in turn, branches to feed the trailing feed passageways 220, 222, and 224 (the last of which feeds the passageway/cavity 226). Other configurations are possible with more or less or different branching.

In addition to these main body cooling passageways, as noted above, the example blade includes a series of a plurality of generally spanwise suction side passageways (passageway legs/segments/sections) and a series of a plurality similar pressure side passageways (e.g., as disclosed generally in the '857 patent, '364 patent, and '550 patent noted above). An example count per side is four to ten. The pressure side passageways include, from upstream to downstream and fore to aft, passageways 310, 312, 314, 316, 318, and 320. In various implementations, the pressure side passageways may be cast by a single pressure side casting core (skin core—e.g., molded ceramic). As artifacts of such casting, adjacent passageways may be connected by a spanwise distributed plurality of linking passageways 334 which are artifacts of core ties linking adjacent core sections which respectively cast the passageways (and extend less deeply into the airfoil cross-section than do the adjacent pressure or suction side passageways). Similarly, the suction side passageways are, from fore to aft and streamwise upstream to downstream, passageways 322, 324, 326, 328, 330, and 332. And as with the other passageways, the suction side skin core has similar/complementary sections with similar (but negative) surfaces.

As with the main body feed passageways, the skin passageways may be fed by associated inlets. FIG. 5 shows inlets 340, 341, and 342 in the root ID face/end for feeding the pressure side skin passageways. In this example, each of these skin passageway inlets feeds a corresponding trunk which, in turn, branches to form two adjacent ones of the skin passageways. Thus, inlet 340 feeds passageways 310 and 312; inlet 341 feeds passageways 314 and 316; and inlet 342 feeds passageways 318 and 320. In a similar fashion, along the suction side, inlet 344 feeds passageways 322 and 324; inlet 345 feeds passageways 326 and 328; and inlet 346 feeds passageways 330 and 332.

As is discussed further below, on each of the pressure side and suction side, each of the skin passageways nests between two adjacent main body passageways. To facilitate the nesting, the skin passageways and associated core sections may be of essentially rounded-corner triangular cross-section (e.g., as in the '364 patent) or otherwise similarly tapering depthwise inward (e.g., a rounded-corner trapezoidal cross-section/footprint). The base 336 (FIG. 4) of the triangle or trapezoid falls adjacent to and essentially parallel to the adjacent pressure side or suction side surface spaced apart therefrom by a wall thickness. Forward 337 and aft 338 sides of the triangle or trapezoidal cross-section converge away from that side surface toward the camber line as do the complementary/associated surfaces of the casting cores. There may be outlet passageways (holes) 339 (e.g., drilled holes (e.g., via electrodischarge machining (EDM), laser drilling, or water jet) or cast holes (e.g., via RMC) from the respective pressure side and suction side skin passageways to the airfoil pressure side and suction side. The example outlet passageways 339 are film cooling holes for discharging a film cooling flow 720. The film cooling holes are angled relative to the associated pressure side or suction side surface so as to have a component in the direction of gas flow 722 (external gas with which the flows 720 merge) over the surface. As in the '550 patent, or otherwise, the pressure side passageways and suction side passageways may extend from inlet ports (FIG. 5) along the root. As in the '550 patent, or otherwise, to accommodate the change in cross-section between root and airfoil, the cross-sectional shapes of the various passageways may transition between airfoil and root as may their nesting arrangement and branching (if any). The casting cores may similarly change.

Figure 4A:
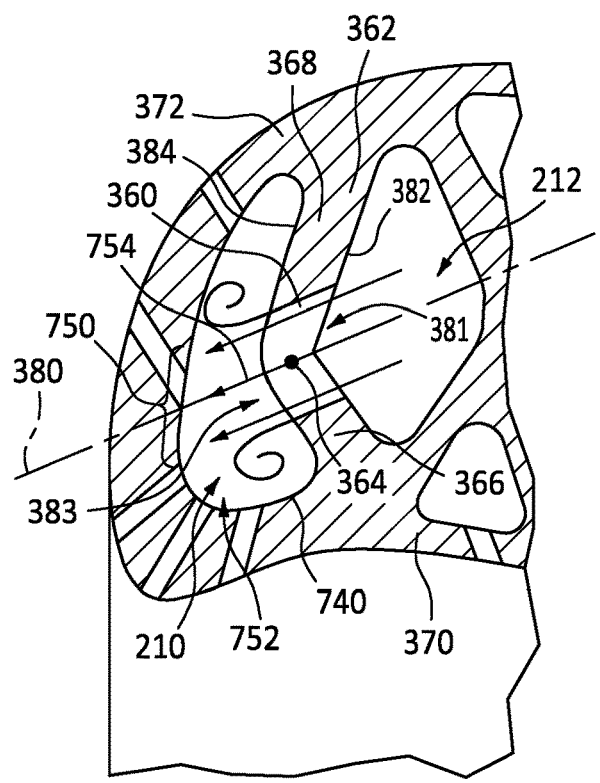
FIG. 4A is an enlarged view of a leading portion of the airfoil of FIG. 4.

A spanwise array of impingement cooling holes 360 (FIG. 4A) in a dividing wall 362 feed the impingement cavity 210 from the next main body passageway 212. An example number of impingement cooling holes is 10 to 25, more particularly, 15 to 20. As noted above, relative to circular-sectioned baseline holes, the holes 360 may be transversely elongate. Also, the wall 362 is angled, having a junction 364 near the camber line 190 and respective pressure side and suction side sections 366 and 368 extending off at an angle $\theta_W$ (FIG. 4) from a vertex formed by the junction 364 to merge with pressure side and suction side walls 370 and 372 (FIG. 4A). The example holes 360 span the junction. Example angle $\theta_W$ can range from 120° to 180° (no vertex), more particularly 120° to 170° or 140° to 160°.

The combination of a transversely elongate impingement hole (and associated ceramic core section) through an angled wall separating the impingement cavity from the adjacent feed passageway leg may provide greater flexibility in tailoring cooling.

In key embodiments, relative to a baseline, the transverse elongation allows the flow to extend further streamwise to the pressure side and/or suction side. In particular examples, the shift is to (or more to) the suction side due to the high external heat load caused by the accelerating gaspath flow on the forward suction side of the airfoil. The orientation of the centerline of the flow may remain unchanged relative to the baseline or may shift (e.g., to the suction side).

Figure 6:
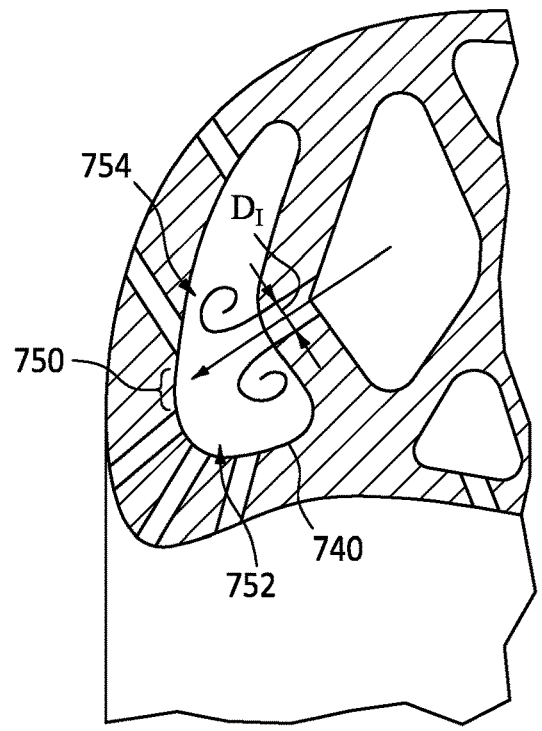
FIG. 6 is an enlarged transverse (generally tangential to the engine centerline) sectional view of a leading portion of an airfoil of a prior art turbine blade.

FIG. 6 shows a baseline leading edge region of an airfoil with a spanwise array of circular-section impingement cooling holes of radius $D_I$. Example $D_I$ (or other transverse dimension) may be measured normal to a centerline of the hole.

Figures 7, 8:
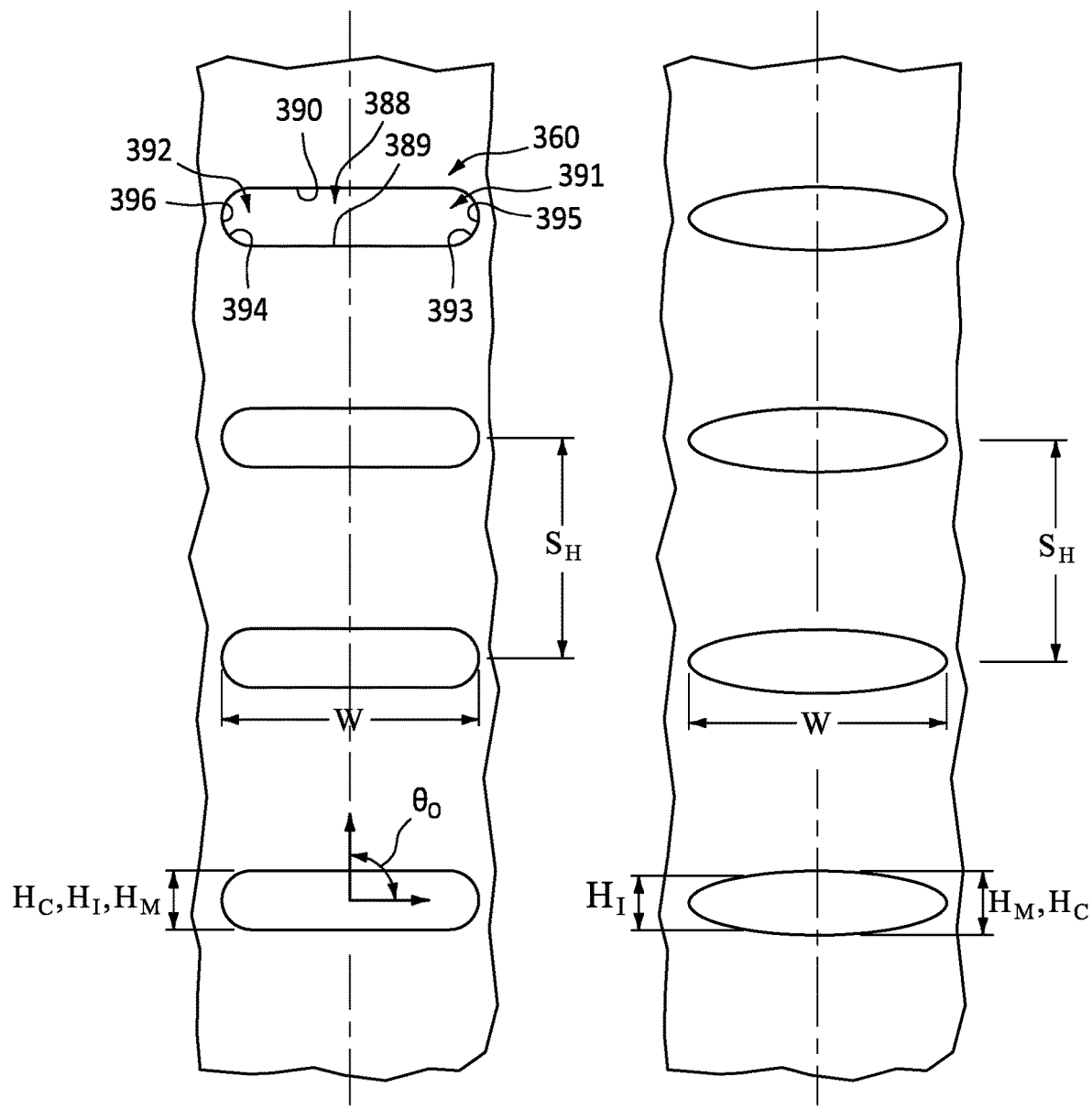
FIG. 7 is a sectional view of impingement feed holes for a turbine blade.
FIG. 8 is a sectional view of alternate impingement feed holes for a turbine blade.

FIG. 4A shows a spanwise array of impingement cooling holes 360 essentially sharing the centerline 380 of the baseline but wherein the cross-section of the impingement cooling holes is transversely elongated with a width W shown in FIG. 7 and a height shown as $H_M$ and $H_C$ respectively as the maximum height and the height at the center (identical in the example embodiment). In the example reengineering from the baseline with an on-center spacing $S_H$ preserved relative to the baseline, W may be larger than $D_I$ and both $H_M$ and $H_C$ may be smaller than $D_I$. In some embodiments, this may have a net effect of preserving per-impingement cooling hole effective cross-sectional area. In terms of aspect ratio, Example W is at least 200% of $H_M$ and $H_C$, more particularly 200% to 800% or 300% to 600%. This may be measured normal to the hole centerline such as the location of minimum width normal to the centerline. Orientationally, a transverse end-to-end direction is shown at an angle $\theta_O$ 70° to 110° off radial and/or off-spanwise, more particularly 75° to 105° or 80° to 100° or 85° to 95°. The holes 360 extend from inlets 381 in the surface 382 of the wall 362 in the passageway leg 212 to outlets 383 in the surface 384 of the wall 362 at the cavity 210. The width and height may be measured in the frame of reference of the hole or the airfoil. With the small range of angular departure the aforementioned aspect ratios of at least 200% or 200% to 800% or 300% to 600% may be similar.

The example FIG. 7 holes are obround in cross-section with generally straight parallel main body portions 388 (between an inner diameter (spanwise/radially inboard) surface region 389 and an outer diameter surface region 390) and essentially semi-circular transverse end portions 391, 392 (bounded by end surface portions 393, 394 at ends 395, 396).

FIG. 8 shows a modified impingement hole of continuously curving approximately elliptical cross-section with similar width. To preserve effective cross-sectional area, $H_M$ and $H_C$ may be greater than those of the obround embodiment. As a characteristic of the tapering toward the transverse ends, a height Hi at an intermediate location (e.g., halfway to the transverse ends) may be an example less than 90% of $H_M$ and $H_C$ (e.g., less than 80% or 40% to 90% or 60% to 80%). This more elliptical cross-section provides a draft angle for the molding of the corresponding surfaces of the associated core section (facilitating core release from the associated die pull).

The result of the widened and shortened (spanwise) cooling hole is to transversely elongate the impingement region 750 (FIG. 4A) of the impingement flow 740 relative to the baseline. Cooling is principally improved due to the broadening of direct impingement, which also causes recirculation zones 752, 754 to be shifted further downstream adjacent the pressure side and suction side.

Figure 9:
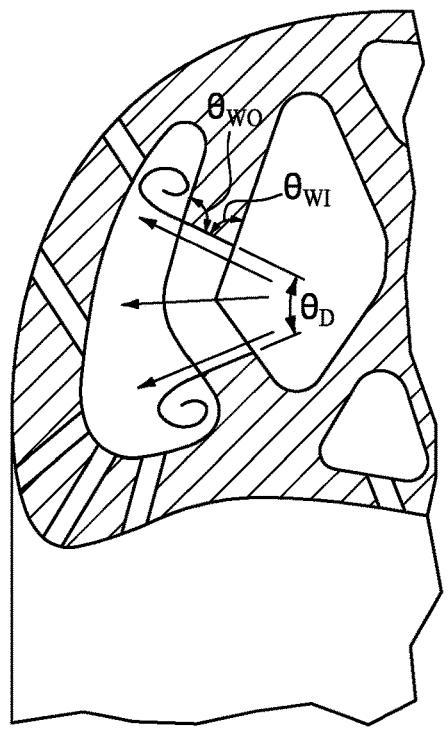
FIG. 9 is an enlarged transverse (generally tangential to the engine centerline) sectional view of a leading portion of an airfoil of a turbine blade having divergent impingement holes.
Figure 10:
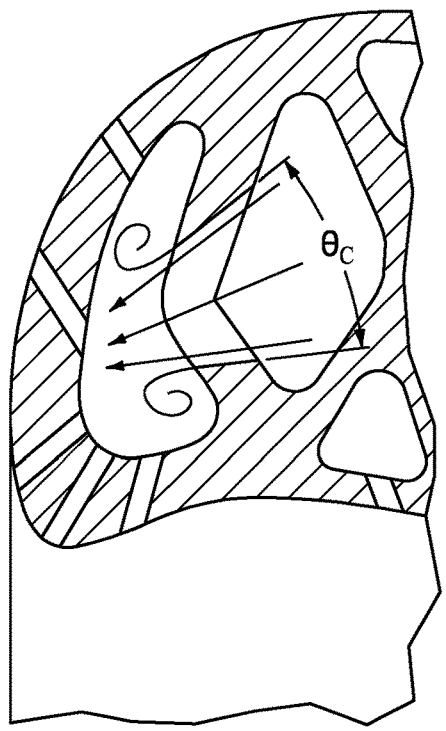
FIG. 10 is an enlarged transverse (generally tangential to the engine centerline) sectional view of a leading portion of an airfoil of a turbine blade having convergent impingement holes.

In addition to the impingement cooling holes of FIG. 4A, FIG. 9 shows laterally divergent impingement cooling holes (diverging at an angle $\theta_D$) and FIG. 10 shows laterally convergent impingement cooling holes (converging at an angle $\theta_C$). Example $\theta_C$ and $\theta_D$ 0-80° or 10-80° or 20-60°. In these particular examples, not only are the impingement holes laterally divergent or convergent, respectively, but also respectively divergent or convergent in cross-sectional area. For example, the heights $H_M$ and $H_C$ may be generally uniform but the width increasing or decreasing, respectively. Thus, the effect is that the laterally divergent impingement cooling hole acts a divergent nozzle and the laterally convergent impingement cooling hole acts as a convergent nozzle. An example change in area has the larger of the inlet or outlet area being 1.25 to 2.0 times the smaller. The divergence in area for the FIG. 9 holes serves to direct the impinging flow towards the pressure and suction sides, thereby increasing heat transfer relative to the heat transfer created by the baseline (straight circular cylindrical prior art holes of FIG. 6) recirculation flow in these locations. Because the flow is diverging, the impingement heat transfer coefficient is less than that of a non-diverging straight hole or converging hole, but it is still larger than the heat transfer generated by the recirculating flow and is spread out over a larger surface.

The convergence in area of the FIG. 10 holes serves to accelerate the flow and increase the impingement heat transfer at a concentrated location. It also acts as a bellmouth to funnel the flow into the hole, thereby providing lower pressure loss of the cooling air as it enters the hole due to the fact that the angle between the hole wall and rib 362 wall at the hole inlet is less than it would otherwise be with a straight hole.

In alternative examples (not shown), the cross-sectional areas of the holes are generally uniform along their lengths. Thus, the laterally divergent holes have upstream ends at the feed passageway leg with less eccentric aspect ratios than downstream ends at the impingement cavity (height decreases as width increases). The opposite is the case for the laterally convergent holes.

With the constant area laterally divergent holes, the constant area from inlet to exit serves to keep the Mach numbers and resulting impingement heat transfer as high as a straight hole while directing the impingement flow towards the pressure and suction sides, spreading out the higher heat transfer coefficient over a larger region.

In the case of the diverging holes (FIG. 9) (whether constant area or diverging area), the angling of the wall 362 synergizes with the elongated holes in that the walls of the diverging holes are closer to perpendicularity with the wall 362 (angles $\theta_{WI}$ at the inlet and $\theta_{WO}$ at the outlet), thereby reducing stress concentrations that would otherwise be there from acute corners associated with divergent holes in straight ribs. It also makes it easier to aim the impingement at the pressure and suction side walls.

In the case of the converging holes (FIG. 10) (whether constant area or converging area), the angling of the wall 362 funnels the flow to the hole, making it easier for cooling flow to enter the hole, thereby reducing pressure loss, due to the fact that the angle between the hole wall and rib 362 wall is less than it would otherwise be on a straight rib.

An additional benefit of the transversely elongated holes (and the transversely elongated casting core sections that cast such holes) is improved core transverse rigidity. This leads to less core breakage and advantageous improvements in positioning accuracy of the core section that cast the impingement cavity. This improvement may occur at one or more of multiple stages in the overall process (e.g., as discussed below).

There may be tendencies of the impingement cavity core section to shift relative to the adjacent feed passageway core section at various stages including: mold release from the core die; subsequent handling, drying or firing; wax overmolding; and, finally, the metal pour into the shell. The transverse elongation improves transverse strength (resisting the impingement cavity core section from shifting toward the pressure side or suction side). Resisting such transverse motion is desired because transverse movement would cause asymmetric variation in wall thickness (the wall 370 or 372 between the impingement cavity and one of the pressure side and suction side would thicken while the other thins). Also, such a shift might affect the aiming of the impingement cooling holes away from a targeted location relative to the leading edge.

Such transverse positioning accuracy will typically be more important than spanwise/radial positioning accuracy. This spanwise/radial thinning of the impingement cooling hole core sections relative to the baseline may reduce resistance to parallelogram-mechanism spanwise/radial shifting of the impingement cavity core section relative to the adjacent feed passageway section. However, such shifts are not as important because they would very slightly increase wall thickness on both the pressure side and the suction side but have little effect on uniformity/symmetry. Also, they might slightly shift the impingement cooling hole centerline generally spanwise/radially but it would still have basically unchanged impingement cooling hole alignment relative to the leading edge.

The transversely elongate impingement cooling holes may be implemented in continuum of situations between a clean sheet design and an extremely limited redesign of a baseline (e.g., where the only change is to replace baseline circular-sectioned impingement cooling holes but other geometry including the wall separating the impingement cavity from the adjacent feed passageway leg are preserved). Such a redesigned blade or vane may be used to replace the associated baseline on a given engine or in a new build of a configuration of baseline engine which previously had the baseline blade or vane.

Additional details (not shown) may reflect those of a baseline or other conventional or yet-developed blades and vanes. Such details include details of particular mounting attachments (fir trees, dovetails, etc. for blades and mounting cars, etc. for vanes), coating systems (thermal barrier, environmental barrier, corrosion, and the like) and so forth.

A particular synergy exists between the so-called bent rib dividing wall and the transversely elongate holes due to core molding case. In particular, the core legs that cast elongate holes itself provide stability of the core while still allowing the core dies to be pulled apart. Core segments to form multiple round holes at the same spanwise location would not be able to be pulled.

Other manufacture steps and their artifacts may again be conventional or yet-developed. These include forming the outlet holes/passageways (e.g., via post-casting drilling or electro-discharge machining or casting in place via refractory metal combs).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Although illustrated in the context of a blade, the basic cores and methods may be used to provide similar passageways in other articles. As noted above, this includes other forms of blades as well as vanes. Additionally, such cores may be used to cast such passageways in non-airfoil elements. One example is struts that extend through the gaspath. Accordingly, other embodiments are within the scope of the following claims.

What is claimed is:

1. A turbine engine airfoil element comprising:
an airfoil having:
  a pressure side and a suction side; and
  a plurality of spanwise passageway legs including:
    a leading edge impingement cavity; and
    a plurality of main body feed passageway legs along a camber line;
  a wall separating the leading edge impingement cavity from a leading one of the main body feed passageway legs, the wall having a suction side section and a pressure side section joining at a junction, the junction forming a vertex of an angle ($\theta_W$) of transverse cross-section of the wall with both a surface of the wall at the impingement cavity and a surface of the wall at the leading one of the main body feed passageway legs angle aftward; and
  a plurality of impingement feed holes through the wall, wherein:
the angle ($\theta_W$) is an aft-facing angle of 120° to 170° so that the wall has respective pressure side and suction side sections with said angle ($\theta_W$) between them;
from the leading one of the main body feed passageways to the leading edge impingement cavity, the plurality of impingement feed holes are divergent in a thickness-wise direction; and
the plurality of impingement feed holes are larger thickness-wise than span-wise and are arranged with a single one of the plurality of impingement feed holes at each one of a plurality of spanwise positions.

2. The turbine engine airfoil element of claim 1 wherein:
the plurality of impingement feed holes have a thickness cross-sectional width at least 200% of a spanwise height and the divergence of the impingement feed holes in the thickness-wise direction combines with the aft-facing angle so that walls of the holes are closer to perpendicular with the wall than would be the case with a straight wall lacking said vertex.

3. The turbine engine airfoil element of claim 1 wherein:
the plurality of impingement feed holes have an obround cross-section.

4. The turbine engine airfoil element of claim 1 wherein:
the plurality of impingement feed holes each have a sectional transverse end-to-end direction 75° to 115° off a spanwise direction of the airfoil.

5. The turbine engine airfoil element of claim 1 wherein:
the angle is 140° to 160°;
the divergence in said thickness-wise direction is at 20° to 60°; and
the plurality of impingement holes span the junction.

6. The turbine engine airfoil element of claim 1 wherein:
the plurality of spanwise passageway legs further comprise a plurality of skin passageways including:
  a plurality of pressure side skin passageways; and
  a plurality of suction side skin passageways.

7. The turbine engine airfoil element of claim 6 wherein:
the pressure side skin passageways and the suction side skin passageways have rounded-corner triangular or trapezoidal cross-section.

8. The turbine engine airfoil element of claim 6 comprising:
four to ten said pressure side skin passageways and four to ten said suction side skin passageways.

9. The turbine engine airfoil element of claim 6 wherein:
adjacent said pressure side skin passageways connect to each other via a plurality of pressure side linking passageways;
adjacent said suction side skin passageways connect to each other via a plurality of suction side linking passageways; and
the pressure side and suction side linking passageways extend less deeply into the airfoil cross-section than do the adjacent pressure or suction side skin passageways.

10. The turbine engine airfoil element of claim 6 being a blade having an attachment root:
the main body passageways extend from one or more inlets at an inner diameter (ID) end of the root; and
the pressure side skin passageways and suction side skin passageways extend from one or more inlets at the inner diameter (ID) end of the root.

11. The turbine engine airfoil element of claim 1 wherein:
the plurality of spanwise passageway legs further comprise a plurality of skin passageways including:
a plurality of pressure side skin passageways each nested between the pressure side and two adjacent main body passageways; and
a plurality of suction side skin passageways each nested between the suction side and two adjacent main body passageways.

12. The turbine engine airfoil element of claim 1 wherein:
the plurality of spanwise passageway legs further include:
a plurality of pressure side passageways including:
at least one first pressure side passageway each nested between the pressure side and two adjacent main body passageways.

13. A turbine engine including the turbine engine airfoil element of claim 1.

14. The turbine engine of claim 13 wherein:
the turbine engine airfoil element is a turbine section blade or vane; and
the angle and the divergence in the thickness-wise direction form means for reducing stress concentration relative to such a divergent hole with such divergence with a straight wall.

15. The turbine engine of claim 13 wherein:
the plurality of impingement feed holes have a sectional transverse end-to-end direction 75° to 115° off a radial direction of the engine.

16. The turbine engine airfoil element of claim 1 wherein:
the plurality of impingement feed holes have respective inlets at said leading one of the main body feed passageway legs and respective outlets at said leading edge impingement cavity; and
said impingement feed holes are divergent in cross-sectional area.

17. The turbine engine airfoil element of claim 1 wherein:
the plurality of impingement feed holes have respective inlets at said leading one of the main body feed passageway legs and respective outlets at said leading edge impingement cavity; and
in area, the respective outlets are 1.25 to 2.0 times the cross-sectional area of the associated inlets.

18. A method for manufacturing the turbine engine airfoil element of claim 1, the method comprising:
assembling to each other:
a feedcore having sections for forming the plurality of main body passageways;
a pressure side skin core having sections for forming a plurality of pressure side passageways; and
a suction side skin core having sections for forming a plurality of suction side passageways;
overmolding the assembly with a fugitive;
shelling the fugitive to form a shell;
casting alloy in the shell; and
deshelling and decoring the cast alloy.

19. The method of claim 18 wherein:
the fugitive is wax and the shell is dewaxed prior to the casting.

20. The method of claim 18 further comprising:
molding the feedcore, the pressure side skin core, and the suction side skin core of ceramic material.

* * * * *